US010078680B2

(12) United States Patent
Yurchenko et al.

(10) Patent No.: US 10,078,680 B2
(45) Date of Patent: Sep. 18, 2018

(54) METHOD FOR STREAMING TRANSACTIONS IN DATABASE CLUSTER

(71) Applicant: Codership Oy, Helsinki (FI)

(72) Inventors: Alexey Yurchenko, Espoo (FI); Seppo Jaakola, Helsinki (FI); Teemu Ollakka, Oulu (FI)

(73) Assignee: Codership Oy, Helsinki (FI)

( * ) Notice: Subject to any disclaimer, the term of this patent is extended or adjusted under 35 U.S.C. 154(b) by 215 days.

(21) Appl. No.: 14/574,256

(22) Filed: Dec. 17, 2014

(65) Prior Publication Data

US 2016/0179917 A1    Jun. 23, 2016

(51) Int. Cl.
*G06F 17/30* (2006.01)
*G06F 9/46* (2006.01)

(52) U.S. Cl.
CPC ........ *G06F 17/30578* (2013.01); *G06F 9/466* (2013.01); *G06F 17/30371* (2013.01)

(58) Field of Classification Search
CPC ......... G06F 17/30389; G06F 17/30442; G06F 17/30445; G06F 17/30448; G06F 17/30578; G06F 17/30657; G06F 17/30516; G06F 17/30545; G06F 2201/80; G06F 11/1469; G06F 17/30362; G06F 9/466; Y10S 707/966; Y10S 707/99934
USPC ....... 707/713, 770, 613, 674, 718, 769, 623, 707/966
See application file for complete search history.

(56) References Cited

U.S. PATENT DOCUMENTS

| | | | | |
|---|---|---|---|---|
| 7,984,043 B1 * | 7/2011 | Waas | ................ | G06F 17/30932 707/718 |
| 8,903,779 B1 * | 12/2014 | Holenstein | .......... | G06F 11/1469 707/685 |
| 2004/0078251 A1 * | 4/2004 | DeMarcken | ........... | G06Q 10/02 705/5 |
| 2005/0102613 A1 * | 5/2005 | Boukouvalas | ...... | G06F 17/2247 715/237 |
| 2005/0125414 A1 * | 6/2005 | Navas | ................ | G06F 17/30011 |
| 2005/0193041 A1 * | 9/2005 | Bourbonnais | ..... | G06F 17/30578 |
| 2006/0004858 A1 | 1/2006 | Tran et al. | | |
| 2006/0031450 A1 | 2/2006 | Unrau et al. | | |
| 2007/0140140 A1 * | 6/2007 | Feeley | .............. | H04L 29/06027 370/252 |
| 2009/0037507 A1 | 2/2009 | Rosman et al. | | |
| 2009/0313311 A1 * | 12/2009 | Hoffmann | ........... | G06F 11/2094 |

(Continued)

*Primary Examiner* — Dennis Truong
(74) *Attorney, Agent, or Firm* — Ziegler IP Law Group, LLC

(57) ABSTRACT

A method for use in a database cluster is provided. A transaction is received at a first node of the database cluster. The transaction is executed at the first node, wherein the transaction produces a plurality of replication events. The plurality of replication events of the transaction are divided into a plurality of fragments, each of which comprises one or more replication events. Subsequently, a set of fragment-specific parameters is assigned to each of the plurality of fragments. The plurality of fragments are then communicated to a second node of the database cluster, one by one, as soon as they are prepared in the first node. A transaction is established in the second node to apply the arriving fragments. With this streaming replication method, the replication of the transaction in the first node, can begin early, before the transaction commits in the first node. This will even out the delay of large transaction replication.

22 Claims, 9 Drawing Sheets

(56) References Cited

U.S. PATENT DOCUMENTS

| | | | |
|---|---|---|---|
| 2010/0121817 A1* | 5/2010 | Meyer | G06F 17/30893 707/623 |
| 2010/0125574 A1* | 5/2010 | Navas | G06F 17/30516 707/722 |
| 2010/0191884 A1* | 7/2010 | Holenstein | G06F 11/2094 710/200 |
| 2011/0251997 A1* | 10/2011 | Wang | G06F 9/466 707/634 |
| 2011/0258179 A1* | 10/2011 | Weissman | G06F 17/30389 707/714 |
| 2011/0302242 A1 | 12/2011 | Kim et al. | |
| 2012/0047126 A1* | 2/2012 | Branscome | G06F 17/30519 707/714 |
| 2012/0078951 A1* | 3/2012 | Hsu | G06F 17/30445 707/769 |
| 2012/0109936 A1* | 5/2012 | Zhang | G06F 17/30312 707/713 |
| 2014/0044015 A1 | 2/2014 | Chen et al. | |
| 2014/0280766 A1* | 9/2014 | Banerjee | H04L 65/60 709/219 |
| 2014/0348087 A1 | 11/2014 | Wu et al. | |

\* cited by examiner

METHOD FOR STREAMING TRANSACTIONS IN DATABASE CLUSTER

TECHNICAL FIELD

The present disclosure generally relates to data synchronization, and more specifically, to methods for use in database clusters. Moreover, the present disclosure relates to computing apparatus for use in database clusters. Furthermore, the present disclosure also concerns computer program products comprising non-transitory machine-readable data storage media having stored thereon program instructions that, when accessed by processing devices, cause the processing devices to perform the aforesaid methods.

BACKGROUND

A typical database cluster includes a plurality of database servers, which are often distributed geographically. In the database cluster, the database servers communicate with each other for data replication and data synchronization purposes. The term "data replication" typically refers to electronic copying of data from one computer or server to other computers or servers. Data replication and data synchronization enable users to access a same level of information and to access data relevant to their tasks without interfering with tasks of other users.

A data replication process can be complex and time-consuming, for example, depending on a size and a number of distributed database servers. Moreover, the data replication process can also be demanding with respect to time and computing resources.

In particular, several problems may be encountered when a size of a transaction grows over a certain limit. These problems will be partially different depending on a type of a database cluster, for example, such as a master-slave database cluster versus a multi-master database cluster, or an asynchronous database cluster versus a synchronous database cluster. The problems are most pronounced in case of a synchronous multi-master database cluster that employs optimistic concurrency control, namely a certification-based replication system.

Some example problems that may be faced by a typical certification-based replication system are provided below. Firstly, a sheer size of a transaction will mean that the replication system has to transfer more data. In this regard, communicating a large transaction to slave nodes over transport media will require a larger memory allocation and will take a longer time. Secondly, a size of metadata for the transaction, for example such as row identifiers, will also be large. During certification, the replication system has to manage a larger certification index, which, in turn, translates into a larger memory allocation for the certification and a longer certification time. Thirdly, a transaction-processing time in a master node will be longer. As a result, the transaction will lock a large number of rows for a longer time. This often causes vulnerabilities for multi-master conflicts, when another transaction that is processing in another node writes to one or more same rows at a same time. Fourthly, applying of the transaction in the slave nodes will take a longer time. This can cause a bottleneck in the slave nodes. Moreover, the replication system may have to wait for the large-sized transaction to apply to the slave nodes completely.

SUMMARY

The present disclosure seeks to provide an improved method for use in a database cluster.

A further aim of the present disclosure is to at least partially overcome at least some of the problems of the prior art, as discussed above.

In a first aspect, embodiments of the present disclosure provide a method for use in a database cluster, the database cluster comprising a plurality of nodes, the method comprising:

receiving a transaction at a first node of the database cluster;

executing the transaction at the first node, wherein the transaction produces a plurality of replication events;

dividing the plurality of replication events of the transaction into a plurality of fragments, wherein each of the plurality of fragments comprises one or more replication events;

assigning a set of fragment-specific parameters to each of the plurality of fragments; and communicating the plurality of fragments to a second node of the database cluster.

In a second aspect, embodiments of the present disclosure provide a method for use in a database cluster, wherein the database cluster comprises a plurality of nodes, the method comprising:

receiving a fragment at a second node of the database cluster, the fragment being associated with a transaction, the fragment comprising one or more replication events;

identifying a set of fragment-specific parameters associated with the fragment;

determining, from the set of fragment-specific parameters, whether or not a streaming transaction to which the fragment belongs exists in a transaction pool; and applying the one or more replication events of the fragment at the second node whilst addressing the streaming transaction to which the fragment belongs.

In a third aspect, embodiments of the present disclosure provide a computing apparatus comprising:

a processor;

a memory coupled to the processor; and a network interface coupled to the processor, wherein the processor is configured to:

receive a transaction;

execute the transaction, wherein the transaction produces a plurality of replication events;

divide the plurality of replication events of the transaction into a plurality of fragments, wherein each of the plurality of fragments comprises one or more replication events;

assign a set of fragment-specific parameters to each of the plurality of fragments; and communicate the plurality of fragments to one or more nodes of a database cluster.

In a fourth aspect, embodiments of the present disclosure provide a computing apparatus comprising:

a processor;

a memory coupled to the processor; and a network interface coupled to the processor, wherein the processor is configured to:

receive a fragment, the fragment being associated with a transaction, the fragment comprising one or more replication events;

identify a set of fragment-specific parameters associated with the fragment;

determine, from the set of fragment-specific parameters, whether or not a streaming transaction to which the fragment belongs exists in a transaction pool; and apply the one or more replication events of the fragment whilst addressing the streaming transaction to which the fragment belongs.

In a fifth aspect, embodiments of the present disclosure provide a computer program product comprising a non-transitory machine-readable data storage medium having stored thereon program instructions that, when accessed by a processing device, cause the processing device to:

receive a transaction;

execute the transaction, wherein the transaction produces a plurality of replication events;

divide the plurality of replication events of the transaction into a plurality of fragments, wherein each of the plurality of fragments comprises one or more replication events;

assign a set of fragment-specific parameters to each of the plurality of fragments; and communicate the plurality of fragments to one or more nodes of a database cluster.

Embodiments of the present disclosure substantially eliminate or at least partially address the aforementioned problems in the prior art, and avoid conflicts during synchronization of large-sized replicated data within a database cluster.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
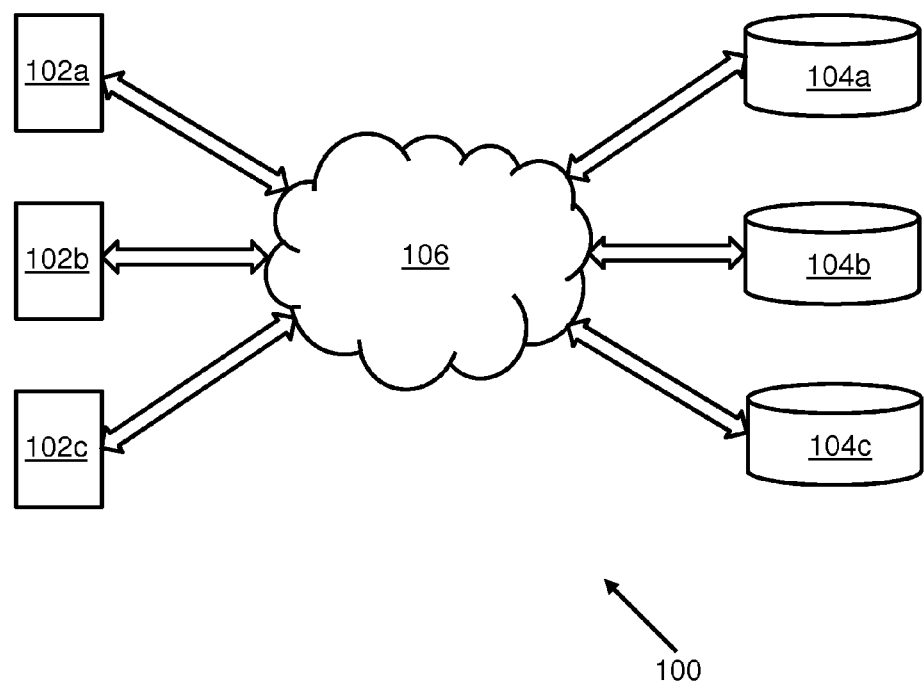
FIG. 1 is a schematic illustration of an example network environment in which a multi-master database cluster is implemented pursuant to the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure has been disclosed, those skilled in the art would recognize that other embodiments for carrying out or practicing the present disclosure are also possible.

Glossary

Brief definitions of terms used throughout the present disclosure are given below.

The term "database" generally refers to an organized collection of machine-readable data.

The term "Database Management System (DBMS)" generally refers to a software application specially designed to manage and manipulate resources in a database. The DBMS provides an interface, such as an Application Programming Interface (API) or a Structured Query Language (SQL) for performing basic database operations, such as create, read, update, and delete (often referred to as CRUD).

The term "database cluster" generally refers to a plurality of database servers or nodes, wherein each database server or node includes a DBMS. Each node resides in its own process space and may reside on the same server or different servers. Each node maintains a copy of a portion or all of resources from other nodes within the database cluster. The nodes are configured to communicate with other nodes, in order to synchronize the resources such that all copies of a particular resource contain the same data.

The term "master node" generally refers to a node in a database cluster to which a client makes a connection, while the term "slave node" generally refers to other nodes in the database cluster for the connection.

The term "transaction" generally refers to a set of one or more data operations that are grouped together, such that either all of these operations execute and have their corresponding results committed, or none of these results are committed. A transaction is typically executed in two phases. In a first phase, all operations in the transaction are executed, and the results are saved in a temporary storage. In a second phase, the results are written to databases within a database cluster. The second phase of writing the results to the databases is often referred to as committing the transaction. After the first phase is completed, a determination can be made as to whether it is desired to commit the transaction. In case of a conflict of synchronization, the transaction is rolled back, i.e., the temporary results are discarded and the databases are not modified.

The term "replication event" generally refers to a logical element related to a transaction that cannot be divided further into smaller elements. A replication event defines changes made during a transaction processing in a master node, and is used as an instruction when applying the transaction in slave nodes. In one example, a replication event can be an original SQL statement. Examples of such replication events include, but are not limited to, DELETE, INSERT, UPDATE, CREATE, ALTER, DROP, SERVER-ERROR, LOGON, LOGOFF, STARTUP and SHUTDOWN. In another example, a replication event can show old and new values for a single column of a database table.

The term "fragment" generally refers to a group of replication events. During replication, a large-sized transaction is divided into a plurality of fragments. Typically, a DBMS generates a log for a given transaction during execution at a master node, wherein the log includes replication events. Thus, the log is divided into a plurality of fragments, each of which includes one or more replication events. As an example, a single SQL statement can cause three replication events, each of which can be applied one-by-one. Thus, the single SQL statement can be divided into three fragments, each including one replication event.

The term "streaming transaction" generally refers to a transaction whose fragments are communicated and replicated one-by-one to nodes in a database cluster.

The term "regular transaction" generally refers to a transaction that is not a streaming transaction. A regular transaction is communicated and replicated as a whole to nodes in a database cluster.

The term "transaction identifier" generally refers to a fragment-specific parameter that uniquely identifies a transaction with which a given fragment is associated. All fragments of a given transaction are identified by a same transaction identifier.

The term "global transaction identifier" or "GTID" generally refers to a fragment-specific parameter that identifies a given fragment. Different fragments of a given transaction are assigned different GTID's. Such GTID's are typically used to globally order fragments and regular transactions in database clusters.

The term "commit flag" generally refers to a fragment-specific parameter that is used to indicate whether or not a given fragment should be committed. A commit flag differentiates a last fragment of a given transaction from other fragments of the given transaction. In this regard, optionally, a status of a commit flag is marked to "YES" for the last fragment of the given transaction, while the status of the commit flag is marked to "NO" for the other fragments.

The term "commit event" generally refers to an event that may be included in a given fragment to indicate that the given fragment is a last fragment of a transaction, and that the transaction can now be committed.

The term "begin flag" generally refers to a fragment-specific parameter that is used to indicate a beginning of a new streaming transaction. A begin flag differentiates a first fragment of a given transaction from other fragments of the given transaction. In this regard, optionally, a status of a begin flag is marked to "YES" for the first fragment of the given transaction, while the status of the begin flag is marked to "NO" for the other fragments.

The term "begin event" generally refers to an event that may be included in a given fragment to indicate that the given fragment is a first fragment of a transaction. The begin event can be used to indicate that a new streaming transaction has begun.

The term "rollback flag" generally refers to a fragment-specific parameter that is used to mark whether or not a given fragment and possibly, its corresponding previous fragments should be rolled back.

The term "rollback event" generally refers to an event that may be included in a given fragment of a given transaction to indicate that the given fragment and possibly, one or more previous fragments of the given transaction should be rolled back.

The term "transaction pool" generally refers to a pool of streaming transactions that is maintained at each node of a database cluster. A transaction pool includes existing streaming transactions.

The term "hot spot" generally refers to a database object, such as a database table, to which several transactions need to write frequently.

The term "client" generally refers to an application, program, process or device in a client/server relationship that requests information or services from another program, process or device (a server) on a communication network. Importantly, the terms "client" and "server" are relative since an application may be a client to one application but a server to another. The term "client" also encompasses software that makes the connection between a requesting application, program, process or device to a server possible, such as an FTP client.

The term "server" generally refers to an application, program, process or device in a client/server relationship that responds to requests for information or services by another program, process or device (a server) on a communication network. The term "server" also encompasses software that makes the act of serving information or providing services possible.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment," "in accordance with an embodiment," and the like generally mean the particular feature, structure, or characteristic following the phrase is included in at least one embodiment of the present disclosure, and may be included in more than one embodiment of the present disclosure Importantly, such phrases do not necessarily refer to the same embodiment.

If the specification states a component or feature "may", "can", "could", or "might" be included or have a characteristic, that particular component or feature is not required to be included or have the characteristic.

In a first aspect, embodiments of the present disclosure provide a method for use in a database cluster, the database cluster comprising a plurality of nodes, the method comprising:

receiving a transaction at a first node of the database cluster;

executing the transaction at the first node, wherein the transaction produces a plurality of replication events;

dividing the plurality of replication events of the transaction into a plurality of fragments, wherein each of the plurality of fragments comprises one or more replication events;

assigning a set of fragment-specific parameters to each of the plurality of fragments; and communicating the plurality of fragments to a second node of the database cluster.

It is to be noted herein that the first node and the second node are a master node and a slave node, respectively, for the transaction. Beneficially, the aforementioned method represents steps performed at the master node. These steps can be implemented in hardware, software, or a combination thereof.

According to an embodiment, the plurality of replication events of the transaction are divided into the plurality of fragments based on at least one of:
- a size of data that is replicated,
- a number of replication events,
- a number of database rows that are modified, and/or
- a number of query statements that are processed.

According to an embodiment, the dividing the plurality of replication events of the transaction is triggered by an application. In one example, the dividing the plurality of replication events of the transaction is triggered by a special command in a query language employed in the database cluster.

According to an embodiment, the set of fragment-specific parameters comprises a transaction identifier and a commit flag. Additionally, optionally, the set of fragment-specific parameters comprises a global transaction identifier (GTID). Additionally, optionally, the set of fragment-specific parameters comprises a rollback flag. Additionally, optionally, the set of fragment-specific parameters comprises a begin flag.

According to an embodiment, the communicating the plurality of fragments comprises streaming a first fragment before a second fragment, the first fragment being created before the second fragment at the first node, namely the master node. In this regard, optionally, the plurality of fragments are communicated and replicated to the second node one-by-one, as soon as they are prepared in the first node. A transaction is established in the second node to apply the arriving fragments. With this streaming replication method, the replication of the transaction in the first node, can begin early, before the transaction commits in the first node. This will even out the delay of large transaction replication.

According to an embodiment, the method further comprises performing a certification process separately and individually for each of the plurality of fragments. In this regard, optionally, the method further comprises committing the transaction, when each of the plurality of fragments completes successfully. Additionally, optionally, the method further comprises rolling back the transaction, when one or more of the plurality of fragments fail.

Preventing Conflicts

As each of the plurality of fragments is certified separately and individually, the transaction gains locks in the database cluster during the processing of the plurality of fragments. This potentially prevents conflicts that typically occur when large transactions are processed in multi-master database clusters with optimistic concurrency control.

In one specific example, if a particular replication event of the transaction requires a write operation to be performed on a known hot spot in the database cluster, the aforementioned application may choose to issue the write operation on the hot spot as early as possible. Accordingly, the aforementioned application may trigger division of the transaction to create a fragment comprising the particular replication event and possibly other replication events. When this fragment is applied at other nodes in the database cluster, the transaction gains locks for the hot spot in the database cluster. As a result, potentially offending transactions must wait for the locks in the database cluster. This prevents conflicts in the database cluster.

Rollbacks

Moreover, optionally, the master node may issue a voluntary rollback for the transaction, when required. For this purpose, the master node may send a fragment carrying a rollback event to slave nodes in the database cluster, so that the slave nodes can remove a corresponding transaction from their respective streaming transaction pools. Additionally or alternatively, a fragment may be marked with a rollback flag.

Moreover, optionally, the master node sets a save point for a transaction, and then issues a rollback to the save point. In order to set a save point to a particular fragment of a streaming transaction, a save point event is appended to that particular fragment. When the slave nodes receive the particular fragment with the save point event, the slave nodes apply the save point event and thus establish the same save point in their transactions. Later, when master node transaction issues rollback to the save point, the slave nodes receive a fragment carrying a corresponding rollback to save point event, and the slave nodes can then apply this partial rollback to the nominated save point. Typically, this fragment should not have a rollback flag set, as the streaming transaction must remain alive after the rollback is performed to the save point.

In a second aspect, embodiments of the present disclosure provide a method for use in a database cluster, wherein the database cluster comprises a plurality of nodes, the method comprising:
  receiving a fragment at a second node of the database cluster, the fragment being associated with a transaction, the fragment comprising one or more replication events;
  identifying a set of fragment-specific parameters associated with the fragment;
  determining, from the set of fragment-specific parameters, whether or not a streaming transaction to which the fragment belongs exists in a transaction pool; and
  applying the one or more replication events of the fragment at the second node whilst addressing the streaming transaction to which the fragment belongs.

It is to be noted herein that the second node is a slave node for the transaction. Beneficially, the aforementioned method represents steps performed at the slave node. These steps can be implemented in hardware, software, or a combination thereof.

According to an embodiment, the method further comprises starting a new streaming transaction in the transaction pool, when a streaming transaction to which the fragment belongs does not exist in the transaction pool. In this regard, optionally, the method further comprises associating the new streaming transaction with a transaction identifier included in the set of fragment-specific parameters, wherein the transaction identifier uniquely identifies the transaction with which the fragment is associated.

According to an embodiment, the set of fragment-specific parameters comprises a transaction identifier and a commit flag. Additionally, optionally, the set of fragment-specific parameters comprises a GTID. Additionally, optionally, the set of fragment-specific parameters comprises a rollback flag. Additionally, optionally, the set of fragment-specific parameters comprises a begin flag.

According to an embodiment, the method further comprises determining from a status of the commit flag whether or not the fragment is a last fragment of the transaction.

According to an embodiment, the method further comprises determining from a status of the begin flag whether or not the fragment is a first fragment of the transaction.

According to an embodiment, the method further comprises committing the transaction, when each fragment of the transaction completes successfully.

Node Drop

When a node drops from the database cluster, a cluster-configuration change event is sent to other nodes in the database cluster. The cluster-configuration change event triggers the other nodes to process their respective transaction pools to identify all existing streaming transactions originating from the dropping node. Such existing streaming transactions can be identified, for example, from a node identifier that is included in their corresponding transaction identifiers. Once identified, these streaming transactions are rolled back and removed from the transaction pools maintained at the other nodes. This prevents a risk that orphaned fragments of these streaming transactions remain live in the other nodes.

Node Join

In some examples, when a new node joins the database cluster, the new node waits for all ongoing streaming transactions to complete.

In other examples, the new node receives all ongoing streaming transactions and their corresponding fragments. In this regard, the new node also receives previous fragments of the ongoing streaming transactions. The new node then builds up a transaction pool and adds these ongoing streaming transactions to the transaction pool. The new node then applies all fragments for the ongoing streaming transactions to synchronize with other nodes of the database cluster. As a life time of a streaming transaction can be long and the number of fragments potentially needed for joining the database cluster may grow large, the fragments of the ongoing streaming transactions are beneficially stored in a persistent storage. This persistent storage should be facilitated by all the nodes of the database cluster. All fragments for a given transaction can be removed from the persistent storage after the given transaction commits.

For illustration purposes only, there will now be considered an example of how the aforementioned methods can be executed in a database cluster. In the example, let us consider that the database cluster includes four nodes, namely nodes A, B, C and D, and that a client opens a connection to the node B and initiates a transaction via the connection. It is to be noted that clients can open connections to any of the nodes A, B, C and D. A node where a client is connected operates as a master node for that connection, while other nodes operate as slave nodes for the connection. In the example herein, the node B operates as a master node for the transaction, while the nodes A, C and D operate as slave nodes for the transaction.

The client sends data pertaining to the transaction to the node B. Upon receiving the data, the node B executes the transaction. As a result, the transaction produces a plurality of replication events.

Beneficially, while executing the transaction, the node B determines whether or not the transaction satisfies one or more fragmentation criteria.

Optionally, the one or more fragmentation criteria are based on at least one of: a size of data that is replicated for the transaction (hereinafter referred to as "replicated data"), a number of replication events in the transaction, a number of database rows that are modified by the transaction, and/or a number of query statements that are processed for the transaction. In a first example, the plurality of replication events of the transaction may be divided when the size of replicated data exceeds a threshold size. In a second example, the plurality of replication events of the transaction may be divided when the number of replication events exceeds a threshold number of replication events. In a third example, the plurality of replication events of the transaction may be divided when the number of database rows exceeds a threshold number of database rows. In a fourth example, the plurality of replication events of the transaction may be divided when the number of query statements exceeds a threshold number of query statements. The aforementioned threshold size, the aforementioned threshold number of replication events, the aforementioned threshold number of database rows and the aforementioned threshold number of query statements can be pre-defined in the database cluster, for example by a system administrator of the database cluster. A person skilled in the art will recognize many variations, alternatives, and modifications of embodiments of how the one or more fragmentation criteria may be defined.

In an embodiment, a fragment size counter is maintained whilst executing the transaction, to keep a track of the number of replication events produced by the transaction. As an example, when the fragment size counter meets the threshold number of replication events, a first fragment is created so as to include all replication events up to the threshold number of replication events. Once the first fragment is created, its corresponding replication events may be flushed from storage. Additionally, the fragment size counter is reset and used to keep a track of remaining replication events produced by the transaction.

If it is determined that the transaction satisfies the one or more fragmentation criteria, the node B divides the plurality of replication events of the transaction into a plurality of fragments, each of which includes one or more replication events. For illustration purposes herein, let us consider that the aforementioned threshold number of replication events is three, and the transaction includes four replication events. Accordingly, the node B divides the four replication events of the transaction into two fragments, namely a first fragment including three replication events and a second fragment including one replication event.

Optionally, such a division of the plurality of replication events of the transaction is performed on a first-come-first-serve basis. In the above example, the first fragment may include first three replication events that are accumulated for the transaction, while the second fragment may include a fourth and last replication event of the transaction. As a result, the first fragment is created before the second fragment.

Moreover, optionally, the dividing the plurality of replication events of the transaction is triggered by an application running at the node B. In one example, the dividing the plurality of replication events of the transaction is triggered by a special command in a query language employed in the database cluster.

Furthermore, the node B assigns a set of fragment-specific parameters to each of the first and second fragments.

Optionally, the set of fragment-specific parameters includes a transaction identifier and a commit flag. Additionally, optionally, the set of fragment-specific parameters includes a GTID. Additionally, optionally, the set of fragment-specific parameters includes a rollback flag. Additionally, optionally, the set of fragment-specific parameters comprises a begin flag.

For a given fragment, the transaction identifier uniquely identifies a transaction with which the given fragment is associated. Thus, a transaction identifier assigned to the second fragment will be same as a transaction identifier assigned to the first fragment.

Optionally, the transaction identifier includes a node identifier for identifying a node from which the given fragment originated. In the above example, the first and second fragments originated from the node B. As an example, the first and second fragments may be assigned "B-7" as the transaction identifier, wherein "B" indicates that the first and second fragments originated from the node B, while "7" indicates a transaction number corresponding to the transaction.

Optionally, GTID's are used to globally order fragments and regular transactions in the database cluster. Accordingly, different fragments of a given transaction are assignment different GTID's. Thus, a GTID assigned to the second fragment will be different from a GTID assigned to the first fragment. Moreover, the first and second fragments are beneficially globally ordered in a manner that the first fragment is applied before the second fragment.

For a given fragment, the commit flag is used to identify whether or not the given fragment is a last fragment of a streaming transaction, and to indicate whether or not the given fragment and its corresponding previous fragments should be committed. In the above example, the second fragment is the last fragment of the transaction. In one example, a status of the commit flag may be marked to "NO" for the first fragment, while a status of the commit flag may be marked to "YES" for the second fragment. It is to be noted here that any suitable values, for example, such as "0" and "1" may be used for the commit flag instead of "NO" and "YES", respectively.

Alternatively, optionally, a commit event may be employed instead of the commit flag. A presence of a commit event in a given fragment of a given transaction indicates that the given fragment is a last fragment of the given transaction, and therefore, should be committed. Accordingly, in the above example, the commit event is appended to the second fragment after the fourth replication event of the transaction.

For a given fragment, the begin flag is used to identify whether or not the given fragment is a first fragment of a streaming transaction, and to indicate when a new streaming transaction has begun. In the above example, a status of the begin flag may be marked to "YES" for the first fragment, while a status of the begin flag may be marked to "NO" for the second fragment. It is to be noted here that any suitable values, for example, such as "0" and "1" may be used for the begin flag instead of "NO" and "YES", respectively.

Optionally, a begin event may be employed to indicate when a new streaming transaction has begun. A presence of a begin event in a given fragment of a given transaction indicates that the given fragment is a first fragment of the given transaction.

For a given fragment, the rollback flag is used to indicate whether or not the given fragment and possibly, its corresponding previous fragments should be rolled back. This is particularly beneficial in case of multi-master database clusters that employ a synchronous replication system with optimistic concurrency control, namely a certification-based replication system. This allows the database cluster to abort a transaction that is non-certifiable.

Alternatively, optionally, a rollback event may be employed instead of the rollback flag. A presence of a rollback event in a given fragment indicates that the given fragment and possibly, its corresponding previous fragments should be rolled back.

Once the set of fragment-specific parameters are assigned, the node B communicates the first and second fragments to the nodes A, C and D. In this regard, optionally, the node B communicates write-sets pertaining to the first and second fragments to the nodes A, C and D.

Optionally, when replicating and communicating the plurality of fragments, the node B replicates and streams the first fragment before the second fragment. Optionally, the first fragment is replicated and streamed as soon as it is created and assigned the set of fragment-specific parameters. Consequently, a process of applying the transaction in slave nodes starts as soon as the first fragment is received at the slave nodes.

Furthermore, upon receiving the write-set pertaining to the first fragment, the nodes A, C and D identify the set of fragment-specific parameters associated with the first fragment. The nodes A, C and D then determine, from the status of the commit flag of the first fragment or an absence of a commit event in the first fragment, that the first fragment is associated with a streaming transaction. Subsequently, the nodes A, C and D determine, from the transaction identifier included in the set of fragment-specific parameters, whether or not the streaming transaction to which the first fragment belongs exists in a transaction pool. Optionally, in this regard, a transaction pool is maintained at each node of the database cluster, wherein the transaction pool includes any existing streaming transactions.

As the first fragment does not belong to any existing streaming transaction, a new streaming transaction is started for the first fragment in the transaction pool at the nodes A, C and D. In this regard, optionally, the new streaming transaction is associated with the transaction identifier of the first fragment, thereby uniquely associating the new streaming transaction with an original transaction with which the first fragment is associated.

Subsequently, the nodes A, C and D apply the replication events of the first fragment within their respective databases, whilst addressing the new streaming transaction in the transaction pool.

Next, upon receiving the write-set pertaining to the second fragment, the nodes A, C and D identify the set of fragment-specific parameters associated with the second fragment. The nodes A, C and D then determine, from the status of the commit flag of the second fragment or a presence of a commit event in the second fragment, that the second fragment is either a regular transaction or a last fragment of a streaming transaction.

Subsequently, the nodes A, C and D determine, from the transaction identifier included in the set of fragment-specific parameters, that the second fragment belongs to the new streaming transaction in the transaction pool, and indeed is the last fragment of the original transaction with which the new streaming transaction is associated.

Thereafter, the nodes A, C and D apply the replication events of the second fragment within their respective databases, whilst addressing the new streaming transaction in the transaction pool.

Moreover, the nodes A, C and D commit the first and second fragments at their respective databases, and remove the new streaming transaction from the transaction pool.

Consequently, the node B also commits the first and second fragments at its database. In this manner, the transaction is executed and committed in all nodes of the database cluster.

It will be appreciated that a certification process is performed separately and individually for each of the first and second fragments in the database cluster. In this regard, optionally, the transaction is committed, when each of the first and second fragments completes successfully. Additionally, optionally, the transaction is rolled back, when one or more of the first and second fragments fail.

In a third aspect, embodiments of the present disclosure provide a computing apparatus comprising:
a processor;
a memory coupled to the processor; and
a network interface coupled to the processor,
wherein the processor is configured to:
receive a transaction;
execute the transaction, wherein the transaction produces a plurality of replication events;
divide the plurality of replication events of the transaction into a plurality of fragments, wherein each of the plurality of fragments comprises one or more replication events;
assign a set of fragment-specific parameters to each of the plurality of fragments; and
communicate the plurality of fragments to one or more nodes of a database cluster.

According to an embodiment, the processor is configured to divide the plurality of replication events of the transaction based on at least one of:
a size of data that is replicated,
a number of replication events,
a number of database rows that are modified, and/or
a number of query statements that are processed.

According to an embodiment, the set of fragment-specific parameters comprises a transaction identifier and a commit flag. Additionally, optionally, the set of fragment-specific parameters comprises a GTID. Additionally, optionally, the set of fragment-specific parameters comprises a rollback flag. Additionally, optionally, the set of fragment-specific parameters comprises a begin flag.

According to an embodiment, the processor is configured to stream a first fragment before a second fragment when communicating the plurality of fragments, the first fragment being created before the second fragment.

In a fourth aspect, embodiments of the present disclosure provide a computing apparatus comprising:
a processor;
a memory coupled to the processor; and
a network interface coupled to the processor,
wherein the processor is configured to:
receive a fragment, the fragment being associated with a transaction, the fragment comprising one or more replication events;
identify a set of fragment-specific parameters associated with the fragment;
determine, from the set of fragment-specific parameters, whether or not a streaming transaction to which the fragment belongs exists in a transaction pool; and
apply the one or more replication events of the fragment whilst addressing the streaming transaction to which the fragment belongs.

According to an embodiment, the processor is configured to start a new streaming transaction in the transaction pool, when a streaming transaction to which the fragment belongs does not exist in the transaction pool.

According to an embodiment, the processor is configured to associate the new streaming transaction with a transaction identifier included in the set of fragment-specific parameters, wherein the transaction identifier uniquely identifies the transaction with which the fragment is associated.

According to an embodiment, the set of fragment-specific parameters comprises a transaction identifier and a commit flag. Additionally, optionally, the set of fragment-specific parameters comprises a GTID. Additionally, optionally, the set of fragment-specific parameters comprises a rollback flag. Additionally, optionally, the set of fragment-specific parameters comprises a begin flag.

According to an embodiment, the processor is configured to determine from a status of the commit flag whether or not the fragment is a last fragment of the transaction.

According to an embodiment, the processor is configured to determine from a status of the begin flag whether or not the fragment is a first fragment of the transaction.

Figure 3:
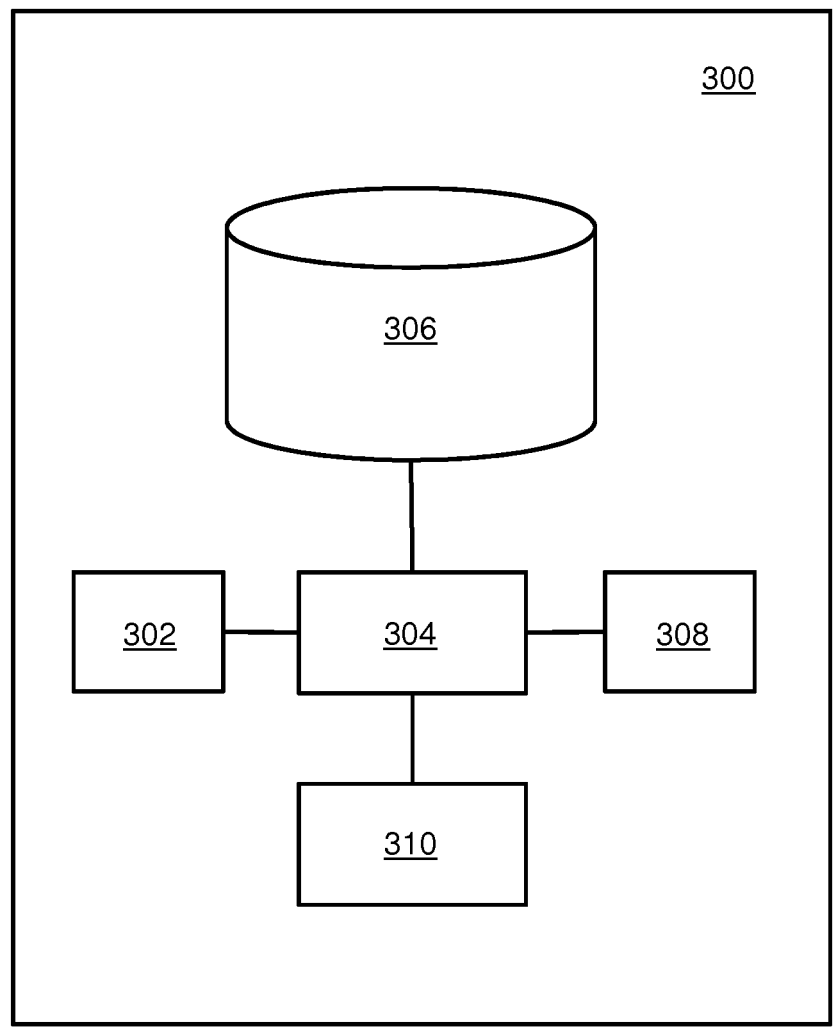
FIG. 3 is a schematic illustration of a computing apparatus for use in a database cluster, in accordance with an embodiment of the present disclosure.

Furthermore, an example of a computing apparatus has been provided in conjunction with FIG. 3. The computing apparatus could be a database server, or a computing device dedicated to running processes associated with databases.

The computing apparatus includes, but is not limited to, a memory, a processor, a data storage, a network interface, and a power source.

The power source supplies electrical power to various components of the computing apparatus. The power source may, for example, include a rechargeable battery.

The memory optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The data storage is a non-transitory data storage arrangement, for example, including a database.

The network interface optionally allows clients to access the computing apparatus, and perform read and/or write operations on the database.

Moreover, the network interface enables the computing apparatus to communicate with other computing apparatus, for example, via a communication network.

Moreover, the processor is configured to perform operations as described earlier.

Furthermore, embodiments of the present disclosure also provide a network environment in which a database cluster can be implemented. The network environment includes one or more clients, a plurality of nodes and a communication network. An example of such a network environment has been provided in conjunction with FIG. 1.

The nodes may, for example, be database servers, processes associated with databases, or computing devices dedicated to running such processes. The nodes may be implemented in a manner that is similar to an implementation of the aforementioned computing apparatus.

The nodes may be installed at separate hardware or at same hardware. In an example, the nodes are optionally distributed geographically. In another example, the nodes are optionally implemented as a cloud service.

Optionally, the communication network couples some or all of the nodes in communication for exchanging data amongst the nodes.

Additionally or alternatively, some of the nodes are coupled in communication via another communication network that is isolated from the communication network.

Additionally or alternatively, some of the nodes are coupled in communication via non-network means, for example, such as Unix domain sockets.

The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

The communication network also provides a communication medium between the clients and the nodes. Consequently, the clients are operable to access the nodes via the communication network. In some examples, the clients are web services that allow users to access the nodes. Accordingly, the clients are optionally operable to perform read and/or write operations on the nodes.

In a fifth aspect, embodiments of the present disclosure provide a computer program product comprising a non-transitory machine-readable data storage medium having stored thereon program instructions that, when accessed by a processing device, cause the processing device to:

receive a transaction;

execute the transaction, wherein the transaction produces a plurality of replication events;

divide the plurality of replication events of the transaction into a plurality of fragments, wherein each of the plurality of fragments comprises one or more replication events;

assign a set of fragment-specific parameters to each of the plurality of fragments; and communicate the plurality of fragments to one or more nodes of a database cluster.

According to an embodiment, the plurality of replication events of the transaction are divided into the plurality of fragments based on at least one of:

a size of data that is replicated,
a number of replication events,
a number of database rows that are modified,
a number of query statements that are processed.

DETAILED DESCRIPTION OF THE DRAWINGS

Referring now to the drawings, particularly by their reference numbers, FIG. 1 is a schematic illustration of an example network environment 100 in which a multi-master database cluster is implemented pursuant to embodiments of the present disclosure. The network environment 100 includes one or more clients, depicted as a client 102a, a client 102b and a client 102c (hereinafter collectively referred to as clients 102). Additionally, the network environment 100 includes a plurality of nodes, depicted as a node 104a, a node 104b and a node 104c (hereinafter collectively referred to as nodes 104). The nodes 104 form the multi-master database cluster. The network environment 100 also includes one or more communication networks, depicted as a communication network 106.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of clients, nodes and communication networks. A person skilled in the art will recognize many variations, alternatives, and modifications of embodiments of the present disclosure.

Figure 2:
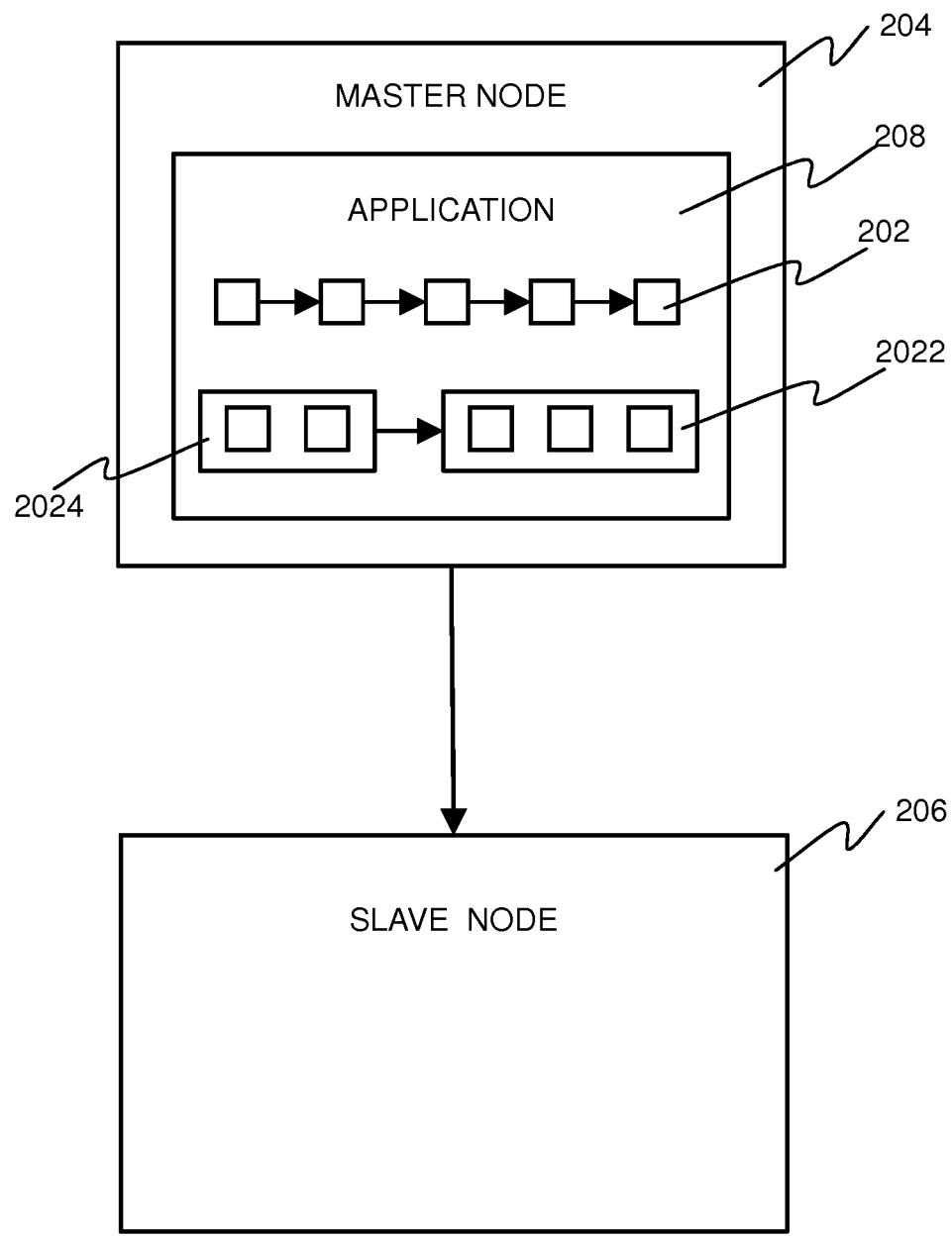
FIG. 2 is a schematic illustration of a transaction being streamed from a master node to a slave node, in accordance with an embodiment of the present disclosure.

FIG. 2 is a schematic illustration of a transaction 202 being streamed from a master node 204 to a slave node 206, in accordance with an embodiment of the present disclosure. The master node 204 is a node from where the transaction 202 originated.

An application 208 running at the master node 204 is configured to trigger fragmentation of a transaction that satisfies one or more fragmentation criteria.

With reference to FIG. 2, the transaction 202 includes five replication events. The application 208 divides the five replication events of the transaction 202 into two fragments, depicted as a first fragment 2022 and a second fragment 2024. The first fragment 2022 includes first three replication events of the transaction 202, while the second fragment 2024 includes last two replication events of the transaction 202.

The master node 204 then streams the first fragment 2022 and the second fragment 2024 to the slave node 206 one-by-one.

FIG. 2 is merely an example, which should not unduly limit the scope of the claims herein. A person skilled in the art will recognize many variations, alternatives, and modifications of embodiments of the present disclosure.

FIG. 3 is a schematic illustration of a computing apparatus 300 for use in a database cluster, in accordance with an embodiment of the present disclosure. The computing apparatus 300 includes, but is not limited to, a memory 302, a processor 304, a data storage 306, a network interface 308, and a power source 310.

FIG. 3 is merely an example, which should not unduly limit the scope of the claims herein. It is to be understood that the specific designation for the computing apparatus 300 is provided as an example and is not to be construed as limiting the computing apparatus 300 to specific numbers, types, or arrangements of modules and/or components of the computing apparatus 300. A person skilled in the art will recognize many variations, alternatives, and modifications of embodiments of the present disclosure.

Figure 4:
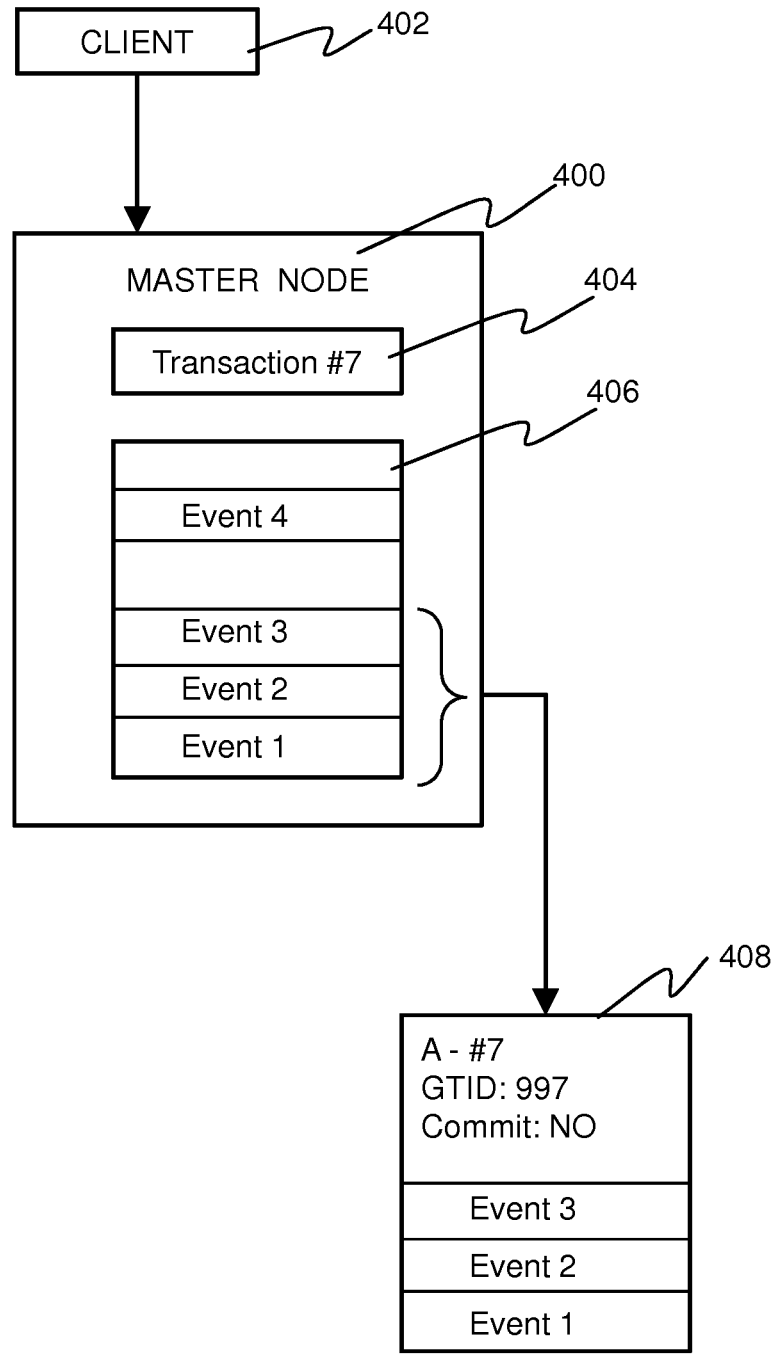
FIG. 4 is a schematic illustration of a processing performed at a master node, in accordance with an embodiment of the present disclosure.

FIG. 4 is a schematic illustration of a processing performed at a master node 400, in accordance with an embodiment of the present disclosure.

A client 402 makes a transaction 404 at the master node 400.

At the master node 400, individual replication events of the transaction 404 are added to an event cache 406. With reference to FIG. 4, the transaction 404 includes four replication events.

Moreover, a fragment size counter keeps a track of a number of replication events in the transaction 404. When the fragment size counter meets a threshold number of replication events, the transaction 404 is divided to create a first fragment 408. With reference to FIG. 4, the threshold number of replication events defined for the fragment size counter is three. As a result, the first fragment 408 includes first three replication events of the transaction 404.

Once the first fragment 408 is created, its corresponding replication events may be flushed from the event cache 406. Additionally, the fragment size counter is reset and used to keep a track of remaining replication events in the transaction 404.

Furthermore, the first fragment 408 is assigned a set of fragment-specific parameters. With reference to FIG. 4, the first fragment 408 is assigned a transaction identifier "A-#7", where "A" represents a node identifier that uniquely identifies the master node 400. The first fragment 408 is also assigned a GTID "997". Additionally, a status of a commit flag is marked to "NO" for the first fragment 408, as it is not a last fragment of the transaction 404.

FIG. 4 is merely an example, which should not unduly limit the scope of the claims herein. A person skilled in the art will recognize many variations, alternatives, and modifications of embodiments of the present disclosure.

Figure 5:
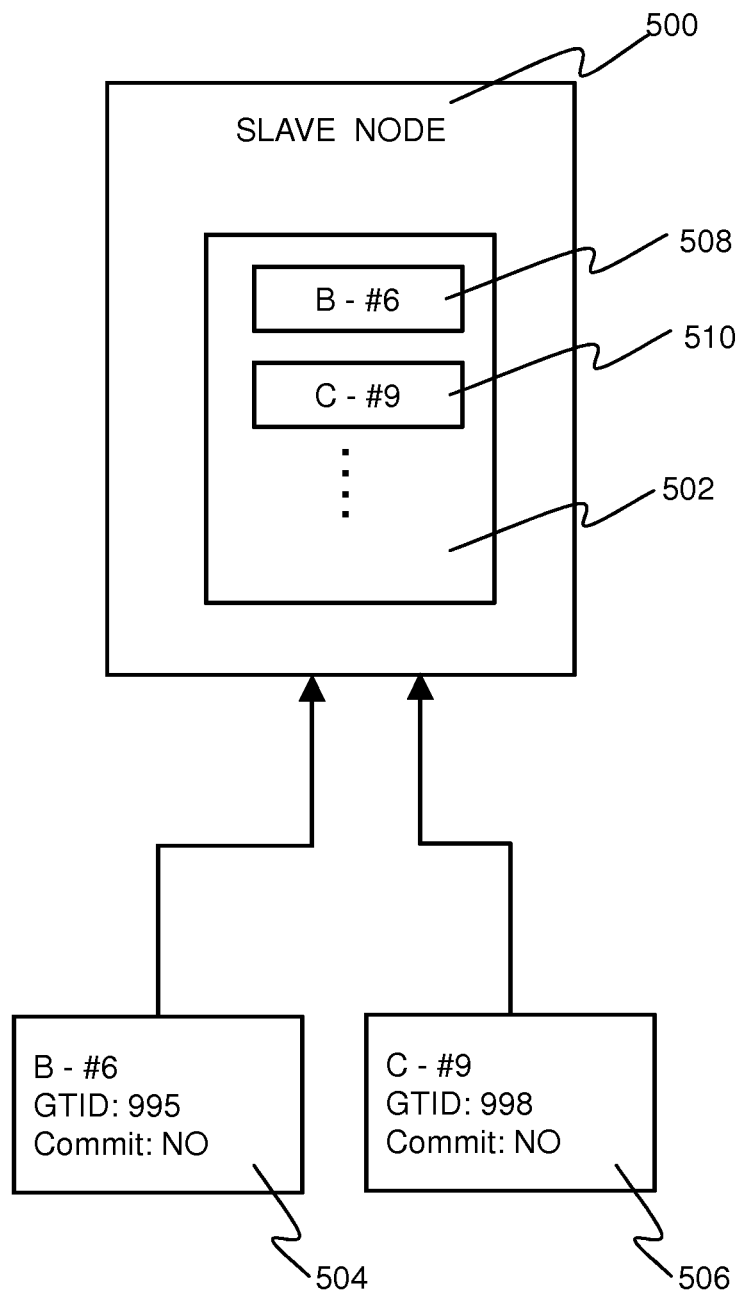
FIG. 5 is a schematic illustration of a processing performed at a slave node, in accordance with an embodiment of the present disclosure.

FIG. 5 is a schematic illustration of a processing performed at a slave node 500, in accordance with an embodiment of the present disclosure.

The slave node 500 maintains a transaction pool 502 of ongoing streaming transactions.

With reference to FIG. 5, the slave node 500 receives fragments 504 and 506.

From transaction identifiers assigned to the fragments 504 and 506, the slave node 500 determines that the fragments 504 and 506 belong to streaming transactions 508 and 510, respectively, in the transaction pool 502. Accordingly, the slave node 500 applies replication events of the fragments 504 and 506 whilst addressing the streaming transactions 508 and 510, respectively, in the transaction pool 502.

FIG. 5 is merely an example, which should not unduly limit the scope of the claims herein. A person skilled in the art will recognize many variations, alternatives, and modifications of embodiments of the present disclosure.

Figure 6A:
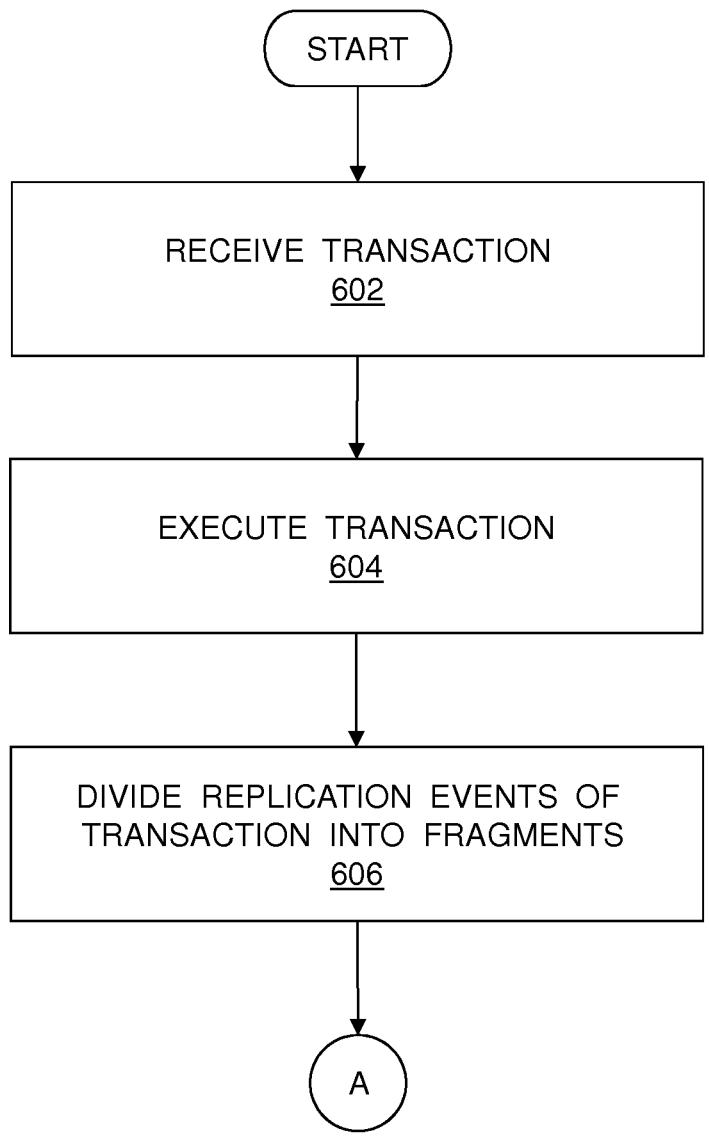
FIGS. 6A-B collectively are an illustration of steps of a method for use in a database cluster, in accordance with an embodiment of the present disclosure.
Figure 6B:
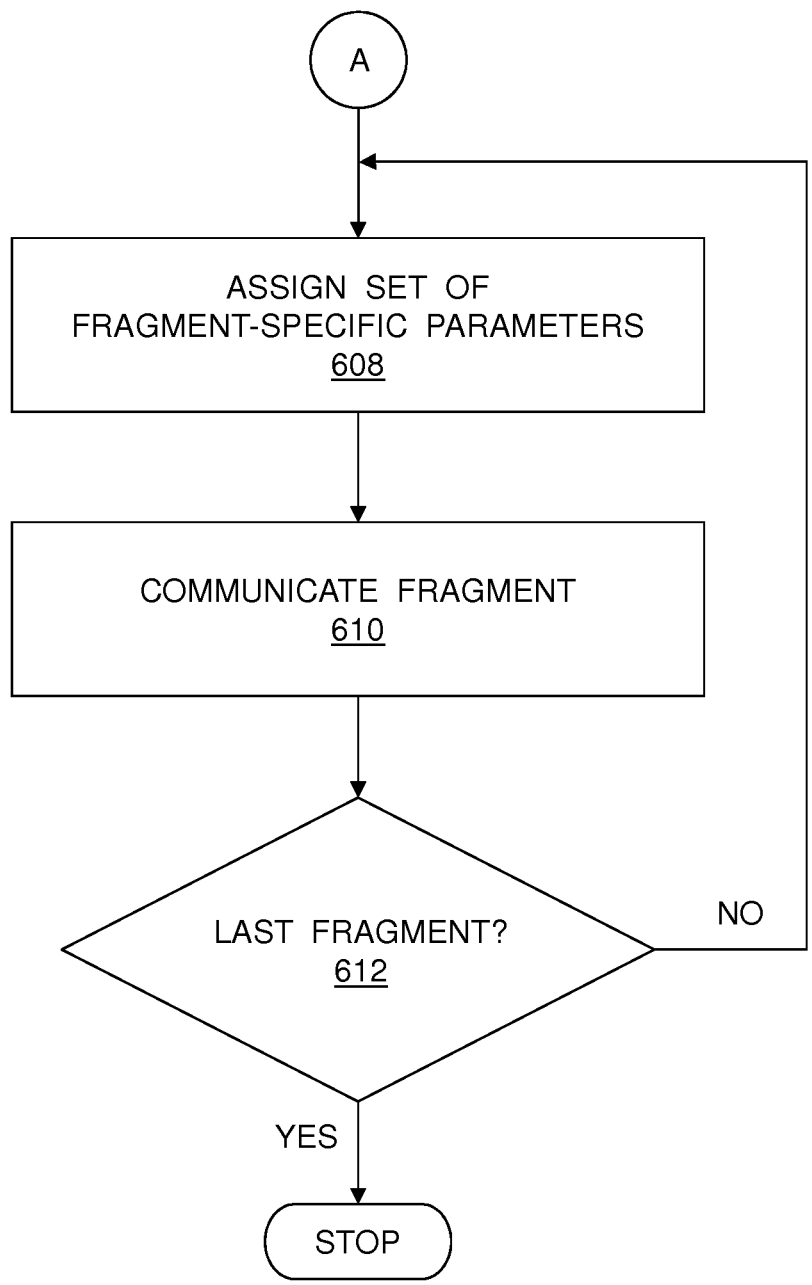

FIGS. 6A and 6B collectively are an illustration of steps of a method for use in a database cluster, in accordance with an embodiment of the present disclosure. The method is depicted as a collection of steps in a logical flow diagram, which represents a sequence of steps that can be implemented in hardware, software, or a combination thereof.

The database cluster includes a plurality of nodes. The nodes are coupled in communication, and are operable to exchange data amongst themselves.

At a step 602, a transaction is received at a given node of the database cluster.

At a step 604, the transaction is executed at the given node. As a result, the transaction produces a plurality of replication events.

At a step 606, the plurality of replication events of the transaction are divided to create a plurality of fragments. Each of the plurality of fragments includes one or more replication events.

At a step 608, a set of fragment-specific parameters is assigned to a fragment created at the step 606.

At a step 610, the fragment is communicated to other nodes of the database cluster.

At a step 612, it is checked whether or not the fragment is a last fragment of the transaction.

If, at the step 612, it is found that the fragment is not the last fragment, the step 608 is performed for a next fragment.

Otherwise, if it is found that the fragment is the last fragment of the transaction, the processing stops.

It should be noted here that the steps 602 to 612 are only illustrative and other alternatives can also be provided where one or more steps are added, one or more steps are removed, or one or more steps are provided in a different sequence without departing from the scope of the claims herein.

Figure 7A:
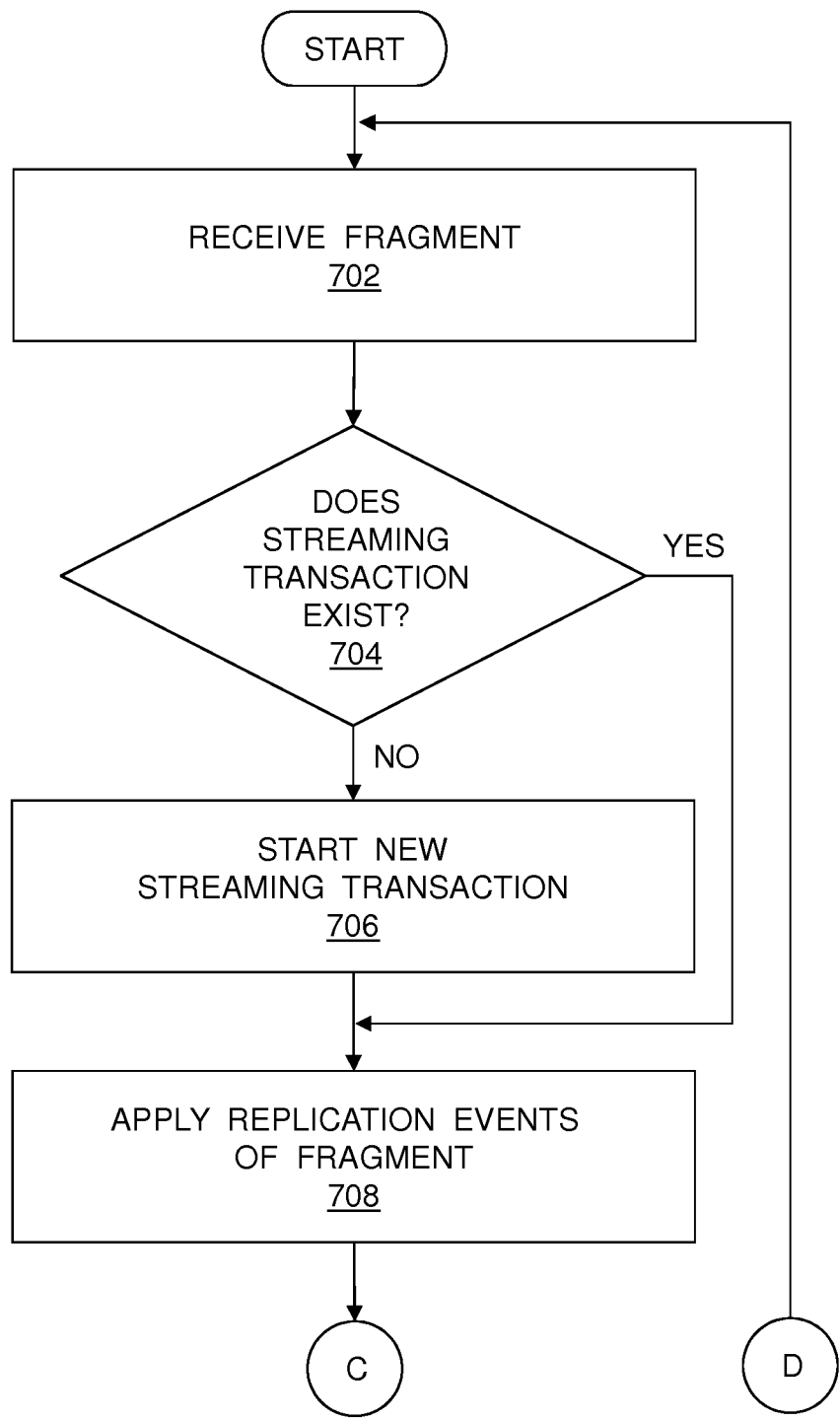
FIGS. 7A-B collectively are an illustration of steps of a method for use in a database cluster, in accordance with an embodiment of the present disclosure.
Figure 7B:
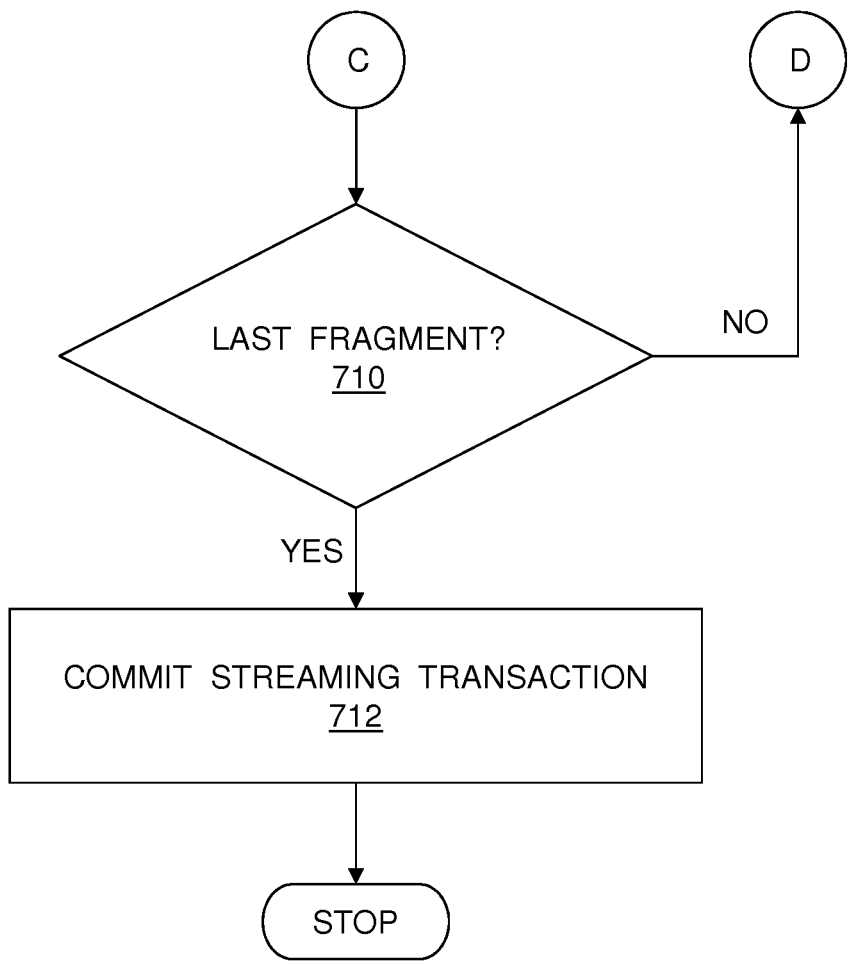

FIGS. 7A and 7B collectively are an illustration of steps of a method for use in a database cluster, in accordance with an embodiment of the present disclosure. The method is depicted as a collection of steps in a logical flow diagram, which represents a sequence of steps that can be implemented in hardware, software, or a combination thereof.

The database cluster includes a plurality of nodes. The nodes are coupled in communication, and are operable to exchange data amongst themselves.

At a step 702, a fragment is received at a given node of the database cluster. The fragment includes one or more replication events.

At a step 704, it is determined whether or not a streaming transaction to which the fragment belongs exists in a transaction pool maintained at the given node.

If, at the step 704, it is determined that a streaming transaction to which the fragment belongs does not exist, a step 706 is performed. Otherwise, if it is determined that a streaming transaction to which the fragment belongs exists, a step 708 is performed.

At the step 706, a new streaming transaction is started in the transaction pool. In accordance with the step 706, the new streaming transaction is associated with a transaction identifier of the fragment.

Next, at the step 708, the one or more replication events of the fragment are applied at the given node, whilst addressing the streaming transaction to which the fragment belongs.

At a step 710, it is checked whether or not the fragment is a last fragment of its transaction.

If, at the step 710, it is found that the fragment is not the last fragment, the step 702 is performed for a next fragment.

Otherwise, if it is found that the fragment is the last fragment, a step 712 is performed. At the step 712, the streaming transaction is committed, and removed from the transaction pool.

It should be noted here that the steps 702 to 712 are only illustrative and other alternatives can also be provided where one or more steps are added, one or more steps are removed, or one or more steps are provided in a different sequence without departing from the scope of the claims herein.

Embodiments of the present disclosure are susceptible to being used for various purposes, including, though not limited to, avoiding conflicts during synchronization of large-sized replicated data within a database cluster.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for use in a database cluster, wherein the database cluster comprises a plurality of nodes, the method comprising:
   receiving a transaction at a first node to be committed at the first node of the database cluster;
   executing the transaction at the first node, wherein the transaction produces a plurality of replication events;
   beginning a replication of the transaction at the first node before committing the transaction in the first node by:
      dividing the plurality of replication events of the transaction into a plurality of fragments, wherein each of the plurality of fragments comprises one or more replication events;
      assigning a set of fragment-specific parameters to each of the plurality of fragments;
      communicating the plurality of fragments to a second node of the database cluster one by one as they are prepared in the first node, wherein at least one of the plurality of fragments is communicated before the transaction is committed at the first node;
   the method further comprising:
      certifying each fragment of the plurality of fragments separately and individually; and
      committing the transaction at both first and second nodes when each fragment of the plurality of fragments completes certification successfully.

2. The method of claim 1, wherein the plurality of replication events of the transaction are divided into the plurality of fragments based on at least one of:
   a size of data that is replicated,
   a number of replication events,
   a number of database rows that are modified,
   a number of query statements that are processed.

3. The method of claim 1, wherein the dividing the plurality of replication events of the transaction is triggered by an application.

4. The method of claim 1, further comprising rolling back the transaction, when one or more of the plurality of fragments fail certification.

5. The method of claim 1, wherein the set of fragment-specific parameters comprises a transaction identifier.

6. The method of claim 1, wherein the communicating the plurality of fragments comprises streaming a first fragment before a second fragment, the first fragment being created before the second fragment at the first node.

7. A method for use in a database cluster, wherein the database cluster comprises a plurality of nodes, the method comprising:
   beginning reception of a plurality of fragments at a second node of the database cluster, one by one as they are replicated from a transaction to be committed at another node of the database cluster, wherein at least one of the plurality of fragments is received before the transaction is committed at the other node, each of the fragments comprising one or more replication events;
   the method further comprising, upon receipt of each received fragment:
      certifying each received fragment separately and individually;
      identifying a set of fragment-specific parameters associated with the received fragment;
      determining, from the set of fragment-specific parameters, whether or not a streaming transaction to which the received fragment belongs exists in a transaction pool; and
      applying the one or more replication events of the received fragment at the second node whilst addressing the streaming transaction to which the fragment belongs;
   the method still further comprising committing the transaction at the first and second node when each fragment of the plurality of received fragments completes certification successfully, and a last one of the plurality of received fragments includes a fragment-specific parameter comprising a commit flag indicating that all of the plurality of received fragments should be committed.

8. The method of claim 7 further comprising starting a new streaming transaction in the transaction pool, when a streaming transaction to which the received fragment belongs does not exist in the transaction pool.

9. The method of claim 8 further comprising associating the new streaming transaction with a transaction identifier included in the set of fragment-specific parameters, wherein the transaction identifier uniquely identifies the transaction with which the received fragment is associated.

10. The method of claim 7, wherein the set of fragment-specific parameters comprises a transaction identifier, and wherein the method further comprises determining from the status of the commit flag whether or not the received fragment is a last fragment of the transaction.

11. The method of claim 7, wherein the set of fragment-specific parameters comprises a begin flag, and wherein the method further comprises determining from a status of the begin flag whether or not the received fragment is a first fragment of the transaction.

12. A computing apparatus comprising:
   a processor;
   a memory coupled to the processor; and
   a network interface coupled to the processor,
   wherein the processor is configured to:
      receive a transaction to be committed at a first node of a database cluster;
      execute the transaction at the first node, wherein the transaction produces a plurality of replication events; and
      begin a replication of the transaction at the first node before committing the transaction in the first node by:
         dividing the plurality of replication events of the transaction into a plurality of fragments, wherein each of the plurality of fragments comprises one or more replication events;
         assigning a set of fragment-specific parameters to each of the plurality of fragments; and
         communicating the plurality of fragments to one or more second nodes of a database cluster one by one as they are prepared when dividing the plurality of replication events of the transaction, wherein at least one of the plurality of fragments is communicated before the transaction is committed at the first node;
   wherein the processor is further configured to:
      certify each fragment of the plurality of fragments separately and individually; and
      commit the transaction at both the first and second nodes when each fragment of the plurality of fragments completes certification successfully.

13. The apparatus of claim 12, wherein the processor is configured to divide the plurality of replication events of the transaction based on at least one of:
   a size of data that is replicated,
   a number of replication events,
   a number of database rows that are modified,
   a number of query statements that are processed.

14. The apparatus of claim 12, wherein the set of fragment-specific parameters comprises a transaction identifier.

15. The apparatus of claim 12, wherein the processor is configured to stream a first fragment before a second fragment when communicating the plurality of fragments, the first fragment being created before the second fragment.

16. A computing apparatus comprising:
   a processor;
   a memory coupled to the processor; and
   a network interface coupled to the processor,
   wherein the processor is configured to:
      begin reception of a plurality of fragments one by one as they are replicated from a transaction to be committed at a node of a database cluster, wherein at least one of the plurality of fragments is received before the transaction is committed at the node, each of the fragments comprising one or more replication events;
   wherein upon receipt of each fragment, the processor is configured to:
      certify each received fragment separately and individually;
      identify a set of fragment-specific parameters associated with the received fragment;

determine, from the set of fragment-specific parameters, whether or not a streaming transaction to which the received fragment belongs exists in a transaction pool; and apply the one or more replication events of the received fragment whilst addressing the streaming transaction to which the fragment belongs;

wherein the processor is further configured to commit the transaction at the apparatus and cause the transaction to be committed at the node when each fragment of the plurality of received fragments completes certification successfully.

17. The apparatus of claim 16, wherein the processor is configured to start a new streaming transaction in the transaction pool, when a streaming transaction to which the received fragment belongs does not exist in the transaction pool.

18. The apparatus of claim 17, wherein the processor is configured to associate the new streaming transaction with a transaction identifier included in the set of fragment-specific parameters, wherein the transaction identifier uniquely identifies the transaction with which the received fragment is associated.

19. The apparatus of claim 16, wherein the set of fragment-specific parameters comprises a transaction identifier, and wherein the processor is configured to determine from the status of the commit flag whether or not the received fragment is a last fragment of the transaction.

20. The apparatus of claim 16, wherein the set of fragment-specific parameters comprises a begin flag, and wherein the processor is configured to determine from a status of the begin flag whether or not the received fragment is a first fragment of the transaction.

21. A computer program product comprising a non-transitory machine-readable data storage medium having stored thereon program instructions that, when accessed by a processing device, cause the processing device to:

receive a transaction to be committed at a first node of a database cluster;

execute the transaction at the first node, wherein the transaction produces a plurality of replication events;

begin a replication of the transaction at the first node before committing the transaction in the first node by:

dividing the plurality of replication events of the transaction into a plurality of fragments, wherein each of the plurality of fragments comprises one or more replication events;

assigning a set of fragment-specific parameters to each of the plurality of fragments; and communicating the plurality of fragments to each of one or more second nodes of a database cluster one by one as they are prepared in the first node, wherein at least one of the plurality of fragments is communicated before the transaction is committed at the first node;

wherein the computer program product further causes the processing device to:

certify each fragment of the plurality of fragments separately and individually; and commit the transaction at the first node and at each of the one or more second nodes of the database cluster when each fragment of the plurality of fragments completes certification successfully and a last one of the plurality of fragments has been assigned a fragment-specific parameter comprising a commit flag indicating that all of the plurality of fragments should be committed.

22. The computer program product of claim 21, wherein the plurality of replication events of the transaction are divided into the plurality of fragments based on at least one of:

a size of data that is replicated,
a number of replication events,
a number of database rows that are modified,
a number of query statements that are processed.

* * * * *